ERWIN M. ROSCHKE
FRANCIS W. CROTTY
INVENTORS
BY Bruce L. Birchard
THEIR AGENT

SUBSCRIPTION TYPE TELEVISION SYSTEM

Filed March 14, 1952 6 Sheets-Sheet 2

ERWIN M. ROSCHKE
FRANCIS W. CROTTY
*INVENTORS*

BY [signature]

THEIR AGENT

SUBSCRIPTION TYPE TELEVISION SYSTEM

Filed March 14, 1952 6 Sheets-Sheet 3

ERWIN M ROSCHKE
FRANCIS W. CROTTY
*INVENTORS*

BY [signature]
THEIR AGENT

ERWIN M. ROSCHKE
FRANCIS W. CROTTY
*INVENTORS*

BY [signature]

THEIR AGENT

ERWIN M. ROSCHKE
FRANCIS W. CROTTY
INVENTORS.
BY [signature]
THEIR AGENT

ERWIN M. ROSCHKE
FRANCIS W. CROTTY
*INVENTORS.*
BY [signature]
THEIR AGENT

Patented Oct. 5, 1954

2,691,061

UNITED STATES PATENT OFFICE 2,691,061

SUBSCRIPTION TYPE TELEVISION SYSTEM

Francis W. Crotty, Park Ridge, and Erwin M. Roschke, Des Plaines, Ill., assignors to Zenith Radio Corporation, a corporation of Illinois Application March 14, 1952, Serial No. 276,516

7 Claims. (Cl. 178—5.1)

This invention relates to subscription type signalling systems, and more particularly to subscription type television systems. This application is a continuation-in-part of application Serial No. 149,358, filed March 13, 1950, which in turn is a division of U. S. application, Serial No. 98,218, filed June 10, 1949, for "Subscription Type Signalling System," and assigned to the present assignee.

In the application of Alexander Ellett et al., Serial No. 742,374, filed April 18, 1947, for "Radio Wire Signalling System," now U. S. Patent No. 2,510,046, issued May 30, 1950, and assigned to the present assignee, there is disclosed and claimed a system for radiating a composite television signal coded in accordance with a predetermined coding schedule and simultaneously transmitting over a second channel including a line circuit a key signal indicating the code schedule of the radiated composite signal.

The application of Erwin M. Roschke, Serial No. 773,848, filed September 12, 1947, for "Subscription Image Transmission System and Apparatus," now U. S. Patent 2,547,598, issued April 3, 1951, and assigned to the present assignee, is directed to a particular type of subscription television system wherein the time relation between the video-frequency signals and the synchronizing-signals of the composite television signal is altered during spaced time intervals to provide coding.

It is an important object of the present invention to provide a novel subscription type television transmitter in which coding is accomplished in a manner different from that utilized in the above-mentioned copending applications.

The present invention provides a subscription type of television transmitter. The transmitter comprises a video-frequency signal generator, such as an iconoscope or an image orthicon, and an associated scanning system for controlling the video-frequency signal generator to develop during recurrent trace intervals video-frequency signals representing a scanned subject and individually having a predetermined maximum amplitude range. The scanning system also includes a timing-signal generator for developing during interposed intervals timing signals normally having a fixed amplitude with respect to the amplitude-range of the video-frequency signals. A mixer device is coupled to the video-frequency generator and to the scanning system to produce a composite television signal which includes in alternation the video-frequency signals and the timing signals. Coding apparatus is coupled to the mixer device and develops a coding signal for altering during spaced time intervals the amplitude relation between the maximum amplitude-range of the video-frequency signals and the amplitude of the timing signals, thereby to code the composite signal. The transmitter is also provided with an antenna or other means for radiating the coded composite signal.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
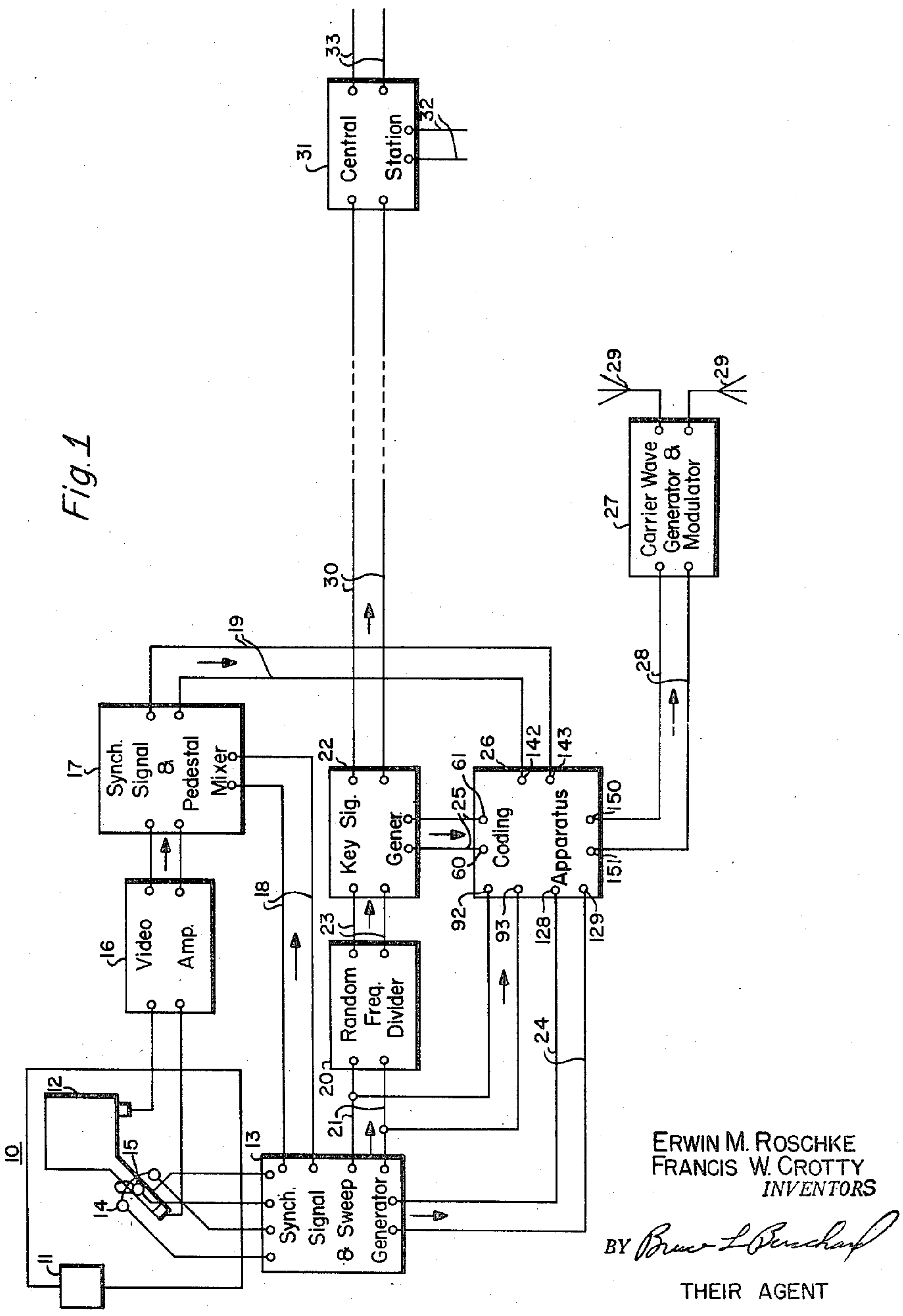
Figure 1 is a schematic block diagram of a subscription type television transmitter constructed in accordance with the present invention.
Figure 2:
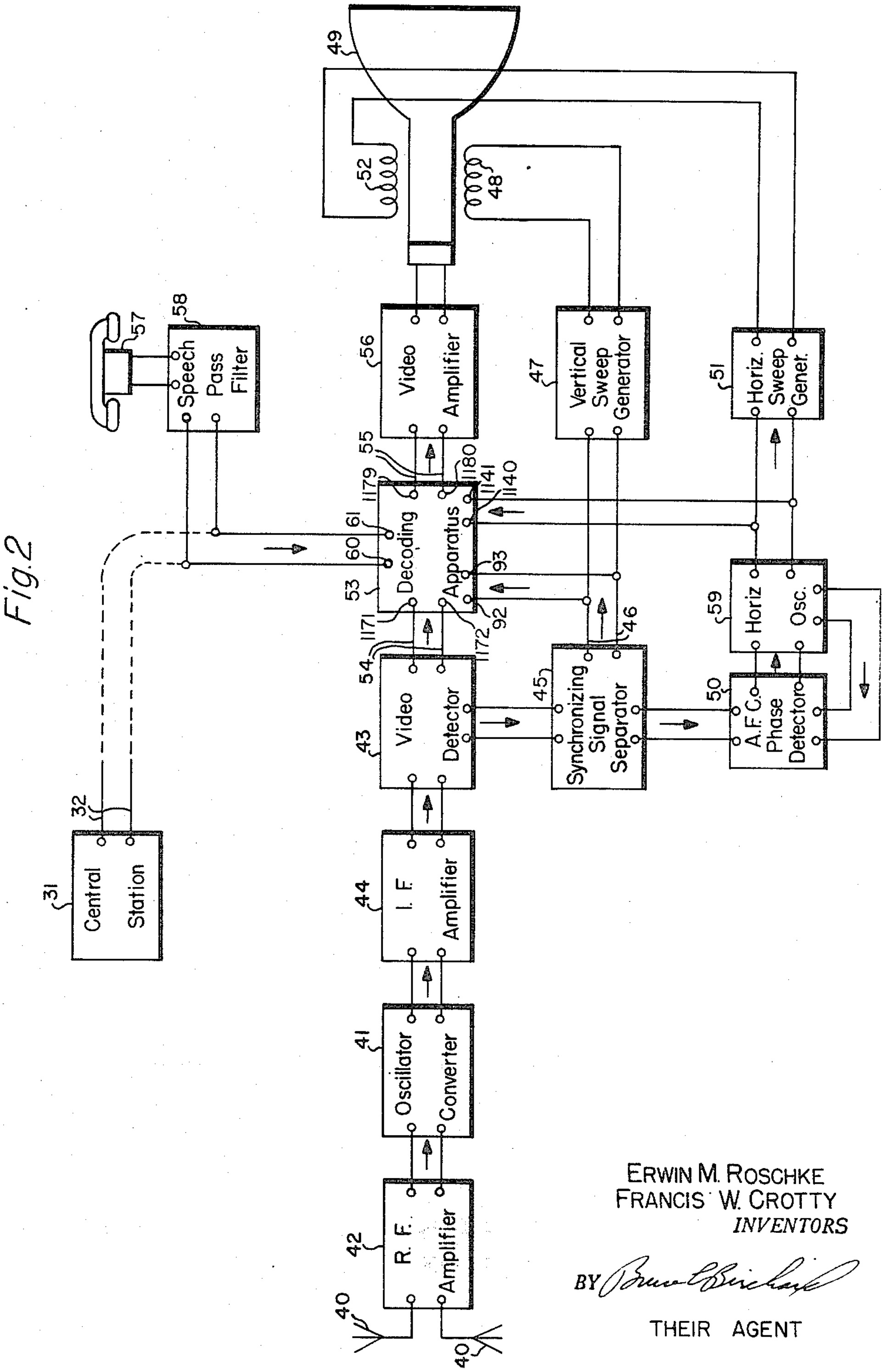
Figure 2 is a schematic block diagram of a subscription type television receiver for receiving coded signals from the transmitter of Figure 1.
Figure 3:
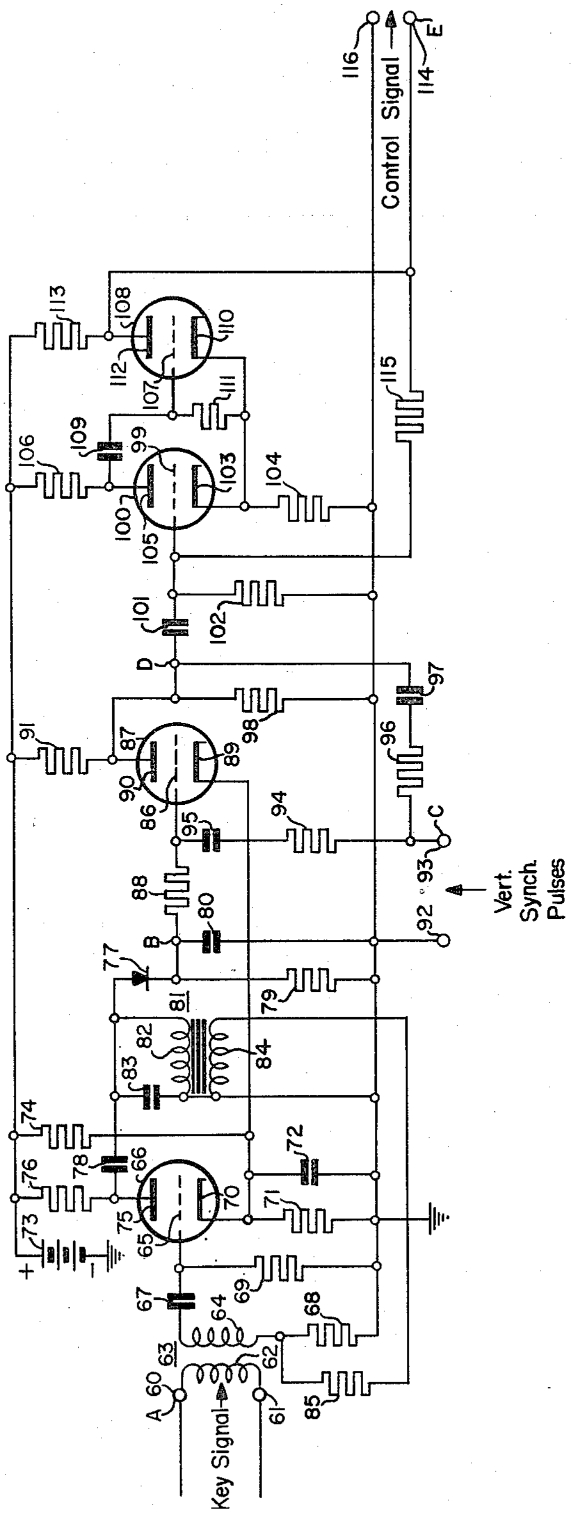
Figure 4:
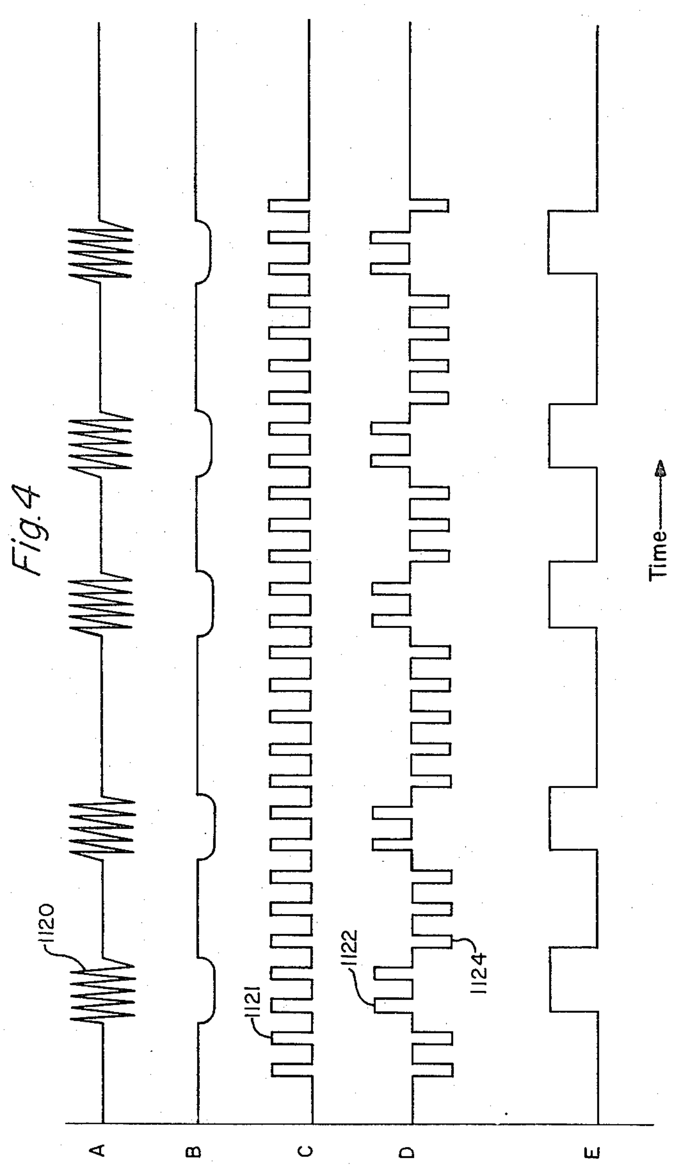
Figure 5:
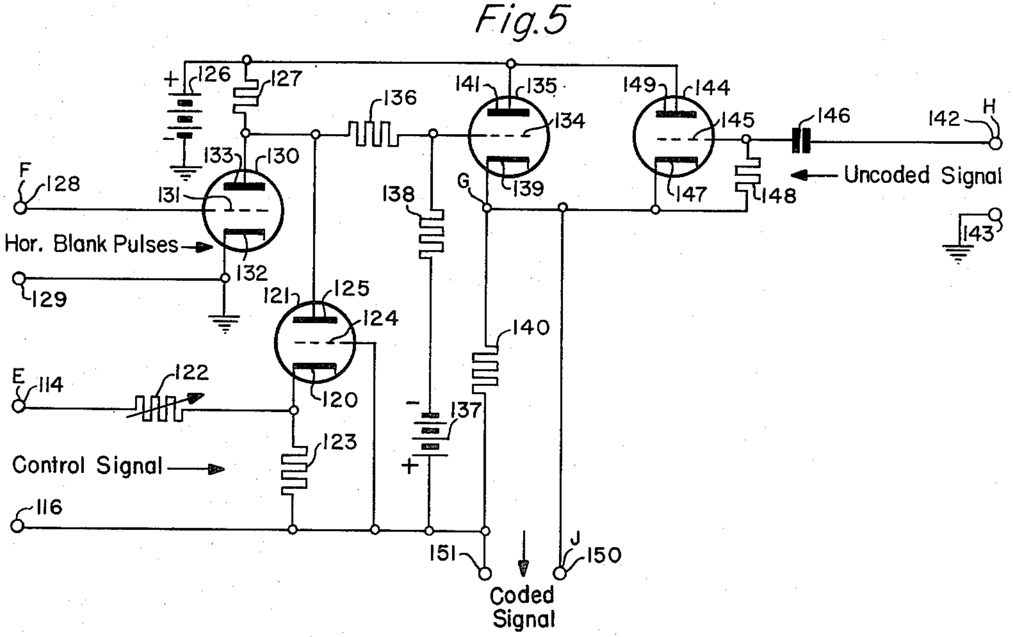
Figure 7:
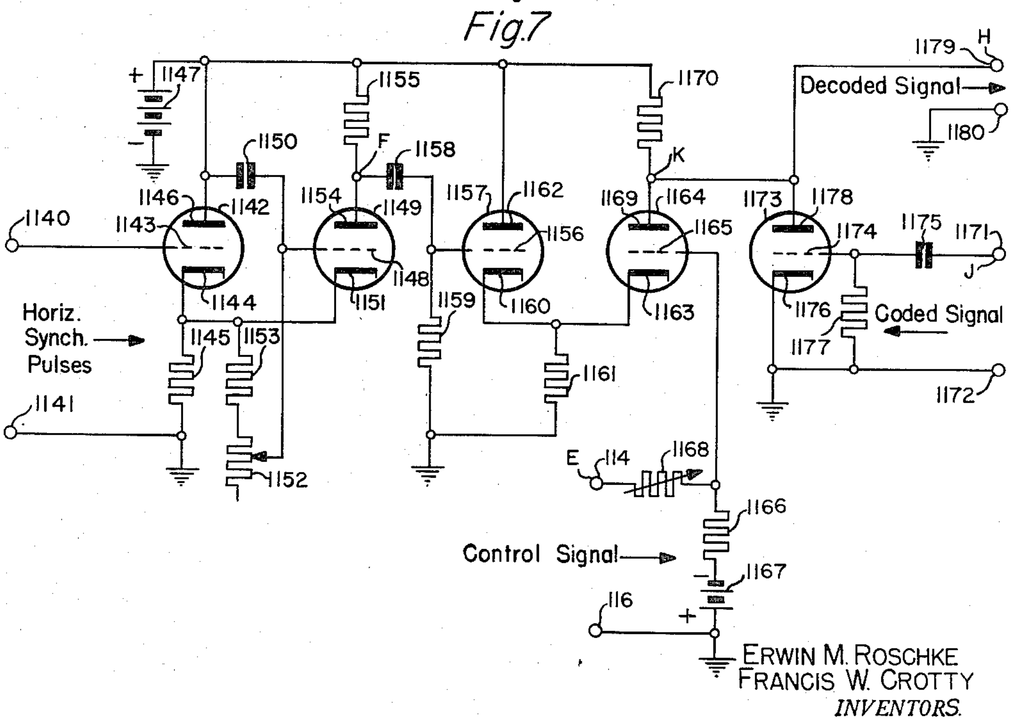

Figures 3, 5, and 7 are schematic circuit diagrams of components of the transmitter and receiver of Figures 1 and 2, and Figures 4 and 6 are simplified graphical representations which are useful in explaining the operation of the invention, these representations not being drawn to scale.

Figure 1 is a schematic block diagram of a subscription type television transmitter embodying the present invention. The transmitter comprises a video-frequency signal generator 10 which includes a lens system 11 and a picture-converting device 12, such as an iconoscope or an image orthicon. Synchronizing-signal and sweep generators 13 provide horizontal and vertical sweep signals for the horizontal and vertical deflection coils 14 and 15, respectively, for controlling generator 10 to develop during recurrent trace intervals video-frequency signals representing a scanned subject. Video-frequency signals produced by picture-converting device 12 and its associated scanning system are passed through a video amplifier 16 to a synchronizing-signal and pedestal mixer device 17, where they are mixed with timing signals received from generator 13 over leads 18 to provide a composite television signal which includes in alternation the video-frequency signals from device 12 and the timing signals received from leads 18. Thus, the output of mixer device 17 appearing on leads 19 represents a signal identical with that which, after modulation on a radio-frequency carrier wave, is radiated from a conventional non-subscription type of television transmitter.

Vertical synchronizing-signal pulses from generator 13 are impressed on a random frequency divider 20 by way of leads 21. Random frequency divider 20 may be, for example, of the type shown and described in the application of Erwin M. Roschke, Serial No. 32,457, filed June 11, 1948, for "Random Frequency Dividers," now U. S. Patent No. 2,588,413, issued March 11, 1952, which application is assigned to the same assignee as the present application.

Frequency divider 20 operates to pass selected vertical synchronizing-signal pulses to a key-signal generator 22 over leads 23. Key-signal generator 22 may be, for example, of the type shown and described in the aforementioned application of Alexander Ellett et al., and generates a key signal comprising bursts of superaudible-frequency energy, the occurrences of which are determined by the pulses passed by frequency divider 20.

Vertical synchronizing-signal pulses from leads 21, horizontal blanking voltage pulses by way of leads 24 from generator 13, and the key signal from leads 25 coupled to key signal generator 22 are all supplied to a coding device 26, the construction of which is to be hereinafter described in detail. The uncoded composite television signal from leads 19 is applied to coding apparatus 26, where it is coded in accordance with a random coding signal developed therein in response to the vertical synchronizing-signal pulses and to the key signal. The coded composite television signal is impressed on a carrier-wave generator and modulator 27 by way of leads 28, and the resutling radio-frequency wave, modulated in accordance with the coded composite television signal, is radiated by means of an antenna 29.

The key signal from generator 22 is impressed on a line circuit 30 extending to a central station 31 for distribution to authorized subscribers over lines 32, 33, etc.

Video-frequency signal generator 10, synchronizing-signal and sweep generator 13, video amplifier 16, mixer device 17, and carrier-wave generator and modulator 27 may all be of conventional construction.

In accordance with the present invention, the coding signal developed in coding apparatus 26 is utilized to alter the maximum amplitude-range of the video-frequency signal relative to the amplitude of the interposed timing signals. This alteration is accomplished at randomly selected spaced time intervals to provide a maximum of secrecy.

Figure 2 is a schematic block diagram of a subscription type television receiver for providing decoded reception of the television signal radiated by the transmitter of Figure 1. The coded composite television signal is intercepted by means of a receiving antenna 40 and impressed on an oscillator-converter 41 where it is heterodyned with a locally generated signal to provide a signal of intermediate-frequency. One or more stages of radio-frequency amplification 42 may be provided before the oscillator-converter 41. The intermediate-frequency output of oscillator-converter 41 is detected in a video detector stage 43 after passing through one or more stages 44 of intermediate-frequency amplification.

Horizontal and vertical synchronizing-signal pulses are derived from the detected output of video detector 43 by means of a synchronizing-signal separator 45. Vertical synchronizing-signal pulses from separator 45, appearing on leads 46, are employed to drive a vertical sweep generator 47 to provide scanning signals for the vertical deflection coils 48 associated with an image-reproducing device or picture tube 49. Horizontal synchronizing-signal pulses from separator 45 are applied to an AFC (automatic frequency control) phase detector 50 for phase comparison with signals from a horizontal oscillator 59. Horizontal oscillator 59 drives a horizontal sweep generator 51 to provide scanning signals for the horizontal deflection coils 52 associated with image-reproducing device 49.

The detected video-frequency signals from video detector 43 are impressed on a decoding device 53 by way of leads 54. Decoding apparatus 53 produces a decoding signal in response to vertical synchronizing-signal pulses from leads 46, horizontal synchronizing-signal pulses from horizontal oscillator 59, and the appropriate key signal from central station 31 by way of leads 32. The decoding signal generated in apparatus 53 is utilized conjointly with the detected video-frequency signals on leads 54 to provide a decoded composite television signal on output leads 55. The decoded composite signal, after amplification in a video amplifier 56, is impressed on the input circuit of image-reproducing device 49.

In the illustrated embodiment, central station 31 is presumed to be a central telephone switchboard, and line 32 may conveniently be an existing telephone line. In order to enable a subscriber to use his telephone handset 57 during the reception of a key signal on line 32, a speech pass filter 58 is inserted between handset 57 and the line. It is to be clearly understood, however, that the invention is not to be limited to the use of telephone circuits as the key-signal channel; it is contemplated that other existing distribution systems, such as the power lines, may be employed for this purpose. It is also possible to avoid the use of a line circuit entirely, as for example by transmitting a coded key signal as an auxiliary modulation on the same carrier wave which bears the coded composite television signal, in the manner described and claimed in the copending application of Walter S. Druz, Serial No. 249,262, filed October 2, 1951, for "Subscription Television System," and assigned to the present assignee.

Those portions of the transmitter and receiver of Figures 1 and 2 which are required to transmit and receive the accompanying sound-signal component form no part of the present invention and are therefore not shown.

Coding apparatus 26 of the transmitter of Figure 1 may be considered as being composed of two portions. The function of the first portion is to produce a control signal the characteristics of which change in response to the next succeeding vertical synchronizing-signal pulse following the initiation of a key signal burst, and also in response to the next succeeding vertical synchronizing-signal pulse after the termination of such burst. This first portion is connected to the key-signal generator 22 by means of leads 25, and to the synchronizing-signal and sweep generator 13 by way of leads 24. The function of the second portion of the coding apparatus is to alter the maximum amplitude-range of the video-frequency signal relative to the amplitude of the timing signals during intervals determined by the control signal. The external connections of the second portion, therefore, extend to the horizontal blanking voltage generator of device 13 by way of leads 21, and to the synchronizing-signal and pedestal mixer 17 by way of leads 19. The coded composite television signal then appears on leads 28 and is supplied to carrier-wave generator and modulator 27.

Thus, the first portion of coding apparatus 26 actuates the second portion during spaced time intervals determined by random frequency divider 20 and key-signal generator 22, during which intervals the amplitude relation between the components of the composite signal is to be altered. The second portion of the coding apparatus, in response to such actuation, generates a coding signal which is superimposed on the uncoded composite television signal to provide a coded composite signal which may be utilized only by authorized subscribers concurrently receiving the appropriate key signal to reproduce a clear image of the scanned subject.

The first portion of the coding apparatus 26, which is connected to key-signal generator 22 and to the vertical synchronizing-signal generator of device 13, is shown schematically in Figure 3, and is substantially identical with similar apparatus disclosed and claimed in the copending application of Albert Cotsworth III et al., Serial No. 79,432, filed March 3, 1949, now U. S. Patent No. 2,632,799, issued March 24,1953, for "Decoding Apparatus for Television Receivers," and assigned to the present assignee. In the circuit of Figure 3, a pair of input terminals 60 and 61 are connected to the primary winding 62 of a coupling transformer 63. One terminal of the secondary winding 64 of transformer 63 is coupled to the control electrode 65 of an electron-discharge device 66 by means of a coupling condenser 67. The other terminal of secondary winding 64 is connected to ground through a resistor 68. Control electrode 65 is connected to ground through a grid resistor 69. The cathode 70 of discharge device 66 is connected to ground by means of a cathode bias resistor 71, which resistor is shunted by a bypass condenser 72. Cathode 70 is also connected to the positive terminal of a source 73 of unidirectional operating potential, here shown as a battery, through a resistor 74. The negative terminal of source 73 is grounded. The anode 75 of device 66 is connected to the positive terminal of source 73 through a load resistor 76. Anode 75 is also coupled to a rectifying device 77 by means of a coupling condenser 78. The other side of rectifying device 77 is connected to ground through the parallel combination of a resistor 79 and a condenser 80.

Regenerative feedback from the output circuit to the input circuit of device 66 is provided by means of a transformer 81 connected therebetween. One terminal of the primary winding 82 of transformer 81 is directly connected to the junction between condenser 78 and rectifying device 77, and the other terminal of the primary winding 82 is coupled to this junction through a condenser 83 and is connected directly to ground. One terminal of the secondary winding 84 of transformer 81 is grounded, and the other terminal of this winding is connected to the junction between resistor 68 and secondary winding 64 of input transformer 63 through a resistor 85.

The control electrode 86 of a second electron-discharge device 87 is connected to the junction between rectifying device 77 and resistor 79 by means of a coupling resistor 88. The cathode 89 of device 87 is directly connected to cathode 70 of device 66. The anode 90 of device 87 is connected to the positive terminal of source 73 through a load resistor 91.

A pair of vertical synchronizing-signal pulse input terminals 92 and 93 are also provided, these terminals being connected to lines 21 of the transmitter of Figure 1. Terminal 92 is directly connected to ground. Terminal 93 is coupled to control electrode 86 of device 87 by means of a resistor 94 and a condenser 95 connected in series, and terminal 93 is also connected to anode 90 of device 87 through a series-connected resistor 96 and condenser 97. Anode 90 is connected to ground through a resistor 98.

Anode 90 of device 87 is coupled to the control electrode 99 of an electron-discharge device 100 by means of a coupling condenser 101. Control electrode 99 is connected to ground through a grid resistor 102. The cathode 103 of device 100 is connected to ground through a cathode resistor 104. The anode 105 of device 100 is connected to the positive terminal of source 73 through a load resistor 106. Anode 105 is also coupled to the control electrode 107 of an additional electron-discharge device 108 by means of a coupling condenser 109. The cathode 110 of device 108 is directly connected to cathode 103 of device 100, and control electrode 107 is connected to cathode 110 by means of a grid resistor 111. The anode 112 of device 108 is connected to the positive terminal of source 73 through a load resistor 113.

One output terminal 114 is connected to control electrode 99 of device 100 through a balancing resistor 115, and the other output terminal 116 is directly connected to ground.

The operation of the circuit of Figure 3, representing the first portion of coding apparatus 26 of the transmitter of Figure 1, may best be understood by reference to Figure 4. Key-signal bursts, shown in curve A, are impressed between terminals 60 and 61 of the circuit of Figure 3. As previously stated, these bursts are initiated by randomly selected vertical synchronizing-signal pulses and are utilized to determine the spaced time intervals during which the amplitude relation between the video-frequency signals and timing signals of the composite television signal is to be altered. In the illustrated embodiment, the key signal bursts are of constant duration determined by the circuit parameters of key signal generator 22. By initiating the change in transmitter mode operation by vertical synchronizing-signal pulses, the mode change is effected at the transmitter during vertical retrace intervals to avoid distortion of the reproduced image which would result if the mode changes were initiated at other times. As pointed out in the above-mentioned Roschke application Serial No. 773,848, each burst of key signal is transmitted over the line circuit one field period before the corresponding change in mode in order to allow for delays which usually occur in the line circuits. In order to simplify the explanation of the present invention, a condition of zero delay is assumed.

The key signal bursts are amplified by device 66. The amplifier is made regenerative by supplying a portion of the output signal back to the input circuit by means of transformer 81 to prevent noise signals and the like from affecting the coding apparatus. Device 66 is made responsive only to signals above a certain threshold level by means of the voltage divider action of resistors 74 and 71 connected between potential source 73 and ground. The amplified key signal bursts from device 66 are rectified by device 77, and negative polarity pulses individually of duration equal to that of the individual key signal bursts, as represented in curve B, appear across resistor 79.

The vertical synchronizing-signal pulses derived from generator 13 of Figure 1 are shown in curve C, and these pulses are impressed between terminals 92 and 93 by means of leads 21. Key-signal burst 1120 of curve A is initiated by a vertical synchronizing-signal pulse corresponding to pulse 1121 in curve C. The rectified negative polarity key-signal bursts, shown in curve B, are impressed on the control electrode 86 of device 87, as are the positive polarity vertical synchronizing-signal pulses from terminal 93. Device 87 is arranged to have an amplification factor of 2, and the circuit characteristics are such that in the presence of each rectified key signal burst, device 87 is non-conductive and the vertical synchronizing-signal pulses are not translated by device 87. However, in the intervals between the rectified key-signal bursts, device 87 is conductive and the positve polarity vertical synchronizing-signal pulses applied to control electrode 86 are amplified and supplied to the control electrode 99 of device 100 as negative polarity pulses of twice their original amplitude. However, positive polarity vertical synchronizing-signal pulses are continuously supplied to control electrode 99 by means of resistor 96 and condenser 97, and these positive polarity pulses are superimposed on the double amplitude negative polarity pulses so that the resulting signal impressed on control electrode 99 comprises positive polarity pulses in the presence of the rectified key signal bursts and negative polarity pulses of equal amplitude in the absence of key signal bursts. This signal is represented in curve D of Figure 4.

Devices 100 and 108 are connected as a conventional single-shot multivibrator circuit arranged so that device 108 is normally conductive. The multivibrator is stable in this condition in the absence of an input signal. The time constant of condenser 109 and resistor 111 is made longer than the duration of any individual key signal bursts and also longer than the longest interval between two successive key signal bursts. Consequently, the multivibrator is maintained in its stable condition until a positive polarity pulse, such as pulse 1122 of curve D, is impressed on control electrode 99 to render device 100 conductive. The multivibrator then trips and device 108 becomes non-conductive. This secondary condition is maintained until such time as a negative polarity pulse 1124 of curve D, is impressed on control electrode 99 to cut off device 100 and restore the multivibrator to its normal condition.

The output of the multivibrator, appearing between terminals 114, and 116, is then represented by curve E of Figure 4. This output is utilized as a control signal to actuate the second portion of the coding apparatus, and the amplitude of the control signal changes at times determined by the vertical synchronizing-signal pulses immediately succeeding the initiation and termination of the individual key-signal bursts from key-signal generator 22.

The second portion of the coding apparatus 26 of the transmitter of Figure 1 is shown schematically in Figure 5. Terminal 114 from the first portion of the coding apparatus (Figure 3) is connected to the cathode 120 of an electron-discharge device 121 through a variable resistor 122, and terminal 116 is grounded. Cathode 120 is connected to ground through a cathode resistor 123. The control electrode 124 of device 121 is directly grounded, and the anode 125 of that device is connected to the positive terminal of a source 126 of unidirectional operating potential, here shown as a battery, through a load resistor 127. The negative terminal of source 126 is grounded.

An additional pair of input terminals 128 and 129, for receiving horizontal blanking voltage pulses from leads 24 of the transmitter of Figure 1, are connected to the input circuit of an additional electron-discharge device 130. Terminal 128 is connected to the control electrode 131 of device 130, and terminal 129 is grounded. The cathode 132 of device 130 is grounded, and the anode 133 of that device is connected to the positive terminal of source 126 through load resistor 127. Anode 133 of device 130 is also directly connected to anode 125 of device 121.

Anode 133 of device 130 is coupled to the control electrode 134 of an electron-discharge device 135 by means of a coupling resistor 136. Control electrode 134 is connected to the negative terminal of a unidirectional biasing potential source 137, here shown as a battery, through a resistor 138. The positive terminal of source 137 is grounded. The cathode 139 of device 135 is connected to ground through a cathode load resistor 140. The anode 141 of device 135 is directly connected to the positive terminal of source 126.

A further pair of input terminals 142 and 143 are connected in the input circuit of another electron-discharge device 144, these terminals receiving the uncoded composite television signals from leads 19 of the transmitter of Figure 1. Terminal 142 is coupled to the control electrode 145 of device 144 by means of a coupling condenser 146. The cathode 147 of device 144 is directly connected to cathode 139 of device 135. A grid resistor 148 is connected between control electrode 145 and cathode 147. The anode 149 of device 144 is directly connected to the positive terminal of source 126.

A pair of output terminals 150 and 151 are connected in the common output circuit of devices 135 and 144. Terminal 150 is directly connected to cathodes 139 and 147, and terminal 151 is grounded.

Figure 6:
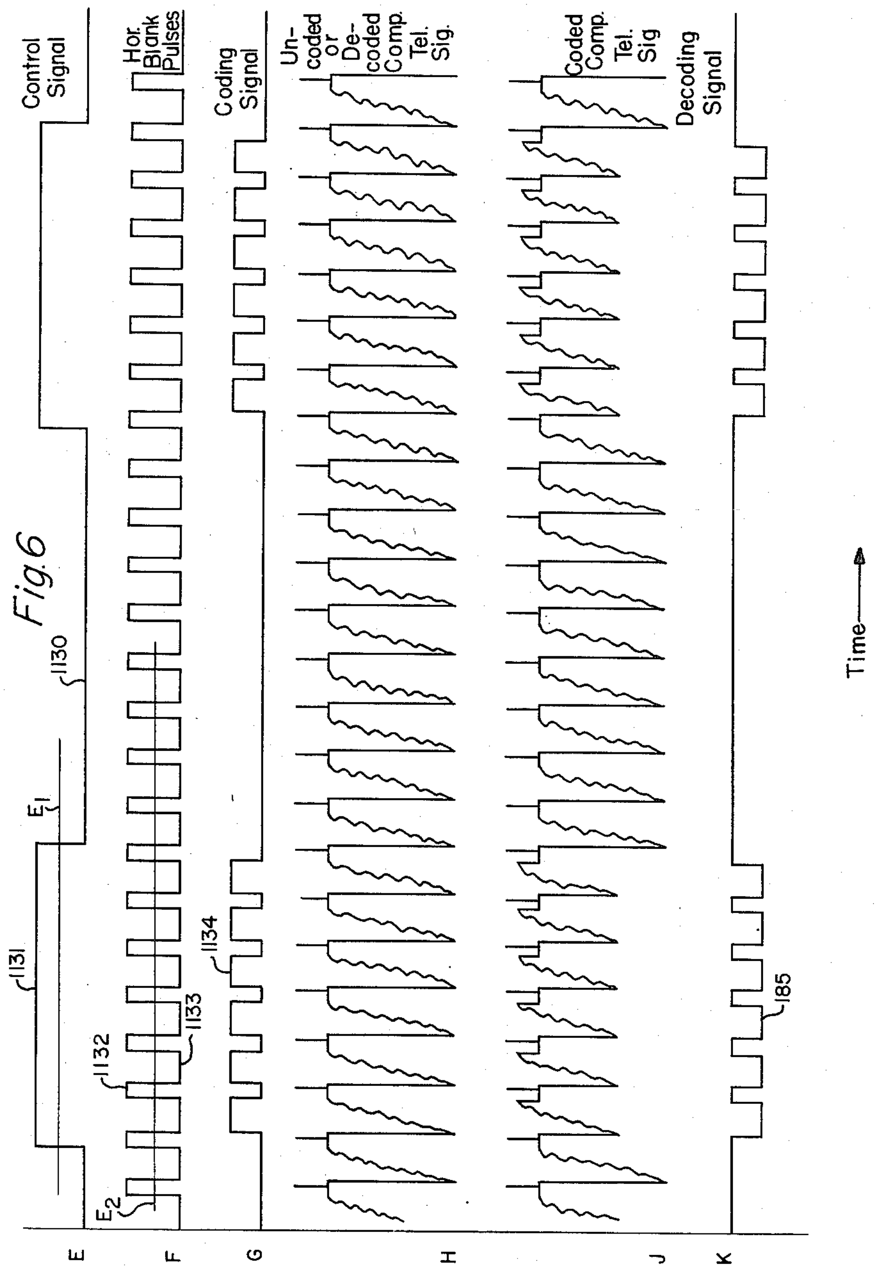

The operation of the second portion of the coding apparatus, shown schematically in Figure 5, may best be understood from a consideration of that diagram taken in conjunction with the waveforms of Figure 6.

Devices 135 and 144 are connected with a common output circuit comprising cathode resistor 140. In the normal state, device 135 is biased to cut-off by potential source 137, and no anode current from device 135 flows through cathode resistor 140. Uncoded composite television signals represented by curve E (Figure 6), applied between terminals 142 and 143 from leads 19 of the transmitter of Figure 1, are translated by device 144 and appear unaltered across output resistor 140 and hence between output terminals 150 and 151. This condition represents normal transmission in the intervals between key-signal bursts.

Curve E of Figure 6 represents the control voltage pulses obtained at output terminals 114 and 116 of the first portion of the coding apparatus shown in Figure 3; it should be noted that curves E of Figures 4 and 6 correspond and represent the same waveform, the scale of curve E of Figure 6 having been expanded with respect to that of curve E of Figure 4. Electron-discharge device 121 of Figure 5 is biased to cut-off at a voltage $E_1$ intermediate the maximum positive and negative values of the control signal voltage. During the intervals between key signal bursts, when the control signal is at its maximum negative potential, device 121 is rendered conductive, and the potential at the anode 133 of device 130 is low. Thus, during the intervals between key signal bursts when the control signal is at its maximum negative potential, device 135 remains in a non-conductive state, and the composite television signal is translated unaltered to the output terminals 150 and 151.

When the control signal is at its maximum positive potential, device 121 is rendered non-conductive and the potential appearing at anode 125 is increased, thus tending to counteract the negative bias potential from source 137 and tending to render device 135 conductive. In this state, device 135 is placed under the control of incoming horizontal blanking voltage pulses from generator 13 of the transmitter of Figure 1. These horizontal blanking voltage pulses, represented by curve F of Figure 6, are applied to the input circuit of electron-discharge device 130, which is biased to cut-off at a voltage $E_2$ intermediate the maximum positive and negative potentials of the blanking voltage pulses. In the presence of a blanking voltage pulse, such as pulse 1132 of curve F, device 130 is rendered conductive, and the potential at anode 133 drops. This potential drop tends to counteract the potential rise due to the cut-off of device 121 and again biases device 135 to cut-off by reason of potential source 137. However, during the intervals between blanking voltage pulses, for example interval 1133 of curve F, device 130 is rendered non-conductive and the potential at anode 133 remains high. This renders device 135 conductive, and produces a voltage component, represented by pulse 1134 of curve G, across cathode resistor 140 due to the anode current of device 135. This pulse is effectively superimposed on the video-frequency signal component of the composite television signal and results in a shift of the maximum amplitude-range of the video-frequency signals relative to the amplitude of the horizontal blanking voltage pulses. Thus, the coded composite television signal appearing between output terminals 150 and 151 is of the type shown in curve J of Figure 6.

The coded composite television signal appearing between terminals 150 and 151 is then supplied to the carrier-wave generator and modulator 27 of the transmitter of Figure 1, and the modulated carrier wave is subsequently radiated by means of antenna 29.

In order to obtain decoded image reproduction at an authorized receiver, the subscriber places a telephone call to a central station to request the appropriate key signal, and a charge is made against the subscriber's account. At an authorized subscriber receiver, such as that shown schematically in Figure 2, the coded composite television signal is intercepted, heterodyned, detected, and passed through decoding apparatus 53 in order to supply a decoded signal to image-reproducing device 49 to enable that device and its associated scanning system to trace an image of the scanned subject.

The decoding apparatus 53 of the receiver also comprises a first portion and a second portion.

The first portion may be identical with the first portion of the coding apparatus used at the transmitter, and this portion of the decoding apparatus operates in the manner shown and described in connection with Figures 3 and 4. The function of the first portion of the decoding apparatus is to provide a control signal at the receiver which is in synchronism with the control signal used at the transmitter to provide coding of the composite television signal. This control signal, represented by curve E of Figure 4, is developed by the circuit of Figure 3 and appears between output terminals 114 and 116.

The second portion of the decoding apparatus 53 is illustrated in schematic form in Figure 7. In Figure 7, a pair of input terminals 1140 and 1141 for receiving horizontal synchronizing-signal pulses from horizontal oscillator 59 of the receiver of Figure 2 are connected in the input circuit of an electron-discharge device 1142. Terminal 1140 is connected to the control electrode 1143 of device 1142, and input terminal 1141 is grounded. The cathode 1144 of device 1142 is connected to ground through a cathode resistor 1145. The anode 1146 of device 1142 is connected to the positive terminal of a source 1147 of unidirectional operating potential, the negative terminal of which is grounded.

Anode 1146 is coupled to the control electrode 1148 of an electron-discharge device 1149 by means of a coupling condenser 1150. The cathode 1151 of device 1149 is directly connected to cathode 1144 of device 1142. Control electrode 1148 is connected to cathode 1151 through a variable resistor 1152 and a fixed resistor 1153 connected in series. The anode 1154 of device 1149 is connected to the positive terminal of source 1147 through a load resistor 1155.

Anode 1154 of device 1149 is coupled to the control electrode 1156 of an electron-discharge device 1157 by means of a coupling condenser 1158. Control electrode 1156 is connected to ground through a grid resistor 1159. The cathode 1160 of device 1157 is connected to ground through a cathode resistor 1161. The anode 1162 of device 1157 is connected to the positive terminal of source 1147.

Cathode 1160 of device 1157 is directly coupled to the cathode 1163 of another electron-discharge device 1164, the control electrode 1165 of which is connected to ground through a resistor 1166 and a source 1167 of negative unidirectional biasing voltage, here shown as a battery. Control electrode 1165 is also connected to input terminal 114 through a variable resistor 1168. The anode 1169 of device 1164 is connected to the positive terminal of source 1147 through a load resistor 1170.

The incoming coded composite television signal is applied to a pair of input terminals 1171 and 1172 connected in the input circuit of an additional electron-discharge device 1173. Terminal 1171 is coupled to the control electrode 1174 of device 1173 through a coupling condenser 1175. Terminal 1172 is directly connected to ground. The cathode 1176 of device 1173 is grounded. Control electrode 1174 of device 1173 is connected to ground through a grid resistor 1177. The anode 1178 of device 1173 is connected to the positive terminal of source 1147 through load resistor 1170.

Output terminals 1179 and 1180 are provided for deriving a decoded signal from the circuit of Figure 7. Terminal 1179 is connected to anode 1178 of device 1173 and terminal 1180 is grounded.

The operation of the circuit of Figure 7 may best be described in connection with the waveforms of Figure 6. Devices 1142 and 1149 and their associated circuit components serve to manufacture horizontal blanking voltage pulses from the horizontal synchronizing-signal pulses applied between terminals 1140 and 1141 from the synchronizing-signal separator 45 of the receiver of Figure 2. The duration of the individual blanking voltage pulses may be adjusted to the appropriate value by means of variable resistor 1152. Thus, synchronized horizontal blanking voltage pulses, represented by curve F of Figure 6 appear at the control electrode 1156 of device 1157.

Electron-discharge device 1164 is biased to cut off at a voltage $E_1$ intermediate the maximum positive and negative potentials 1131 and 1130 respectively of the control signal of curve E. Thus, when the control signal is at its maximum negative potential 1130, during intervals of normal reception, device 1164 is rendered non-conductive, and no component of the current in load resistor 1170 is due to the anode current of device 1164. In such a condition, coded composite television signals applied between terminals 1171 and 1172 by way of leads 54 from the video detector 43 (Figure 2) are translated by device 1173 and appear in unaltered amplitude relation across load resistor 1170 and hence between output terminals 1179 and 1180.

When the control signal is at its maximum positive potential 1131, the voltage developed across resistor 1166 tends to counteract the voltage of source 1167, and places electron-discharge device 1164 under the control of the horizontal blanking voltage pulses impresses on control electrode 1156 of device 1157. Device 1157 is biased to cut off at a voltage $E_2$ (curve F) intermediate the maximum positive and negative potentials 1132 and 1133 of the blanking voltage pulses. Thus, in the presence of a horizontal blanking voltage pulse, such as pulse 1132 of curve F, device 1157 is rendered conductive, and the potential of cathode 1163 of device 1164 is raised, thus maintaining device 1164 in a non-conductive state and allowing the timing-signal components of the incoming coded composite television signal to appear in unaltered amplitude relation between output terminals 1179 and 1180. However, during intervals between blanking voltage pulses such as intervals 1133, device 1157 is rendered non-conductive, and the potential of cathode 1163 of device 1164 drops. This renders device 1164 conductive and generates a voltage component 185 of curve K in resistor 1170. Thus, during video-frequency signal intervals of the coded composite television signal, when the control signal is at its maximum positive potential, a decoding signal (curve K), which is complementary to the coding signal of curve G utilized at the transmitter, is effectively superimposed on the incoming coded signal, and the output appearing between terminals 1179 and 1180 is effectively decoded to produce the waveform shown in curve H.

The description of the construction and operation of the illustrated system has been predicated on the assumption that the coded composite television signal is not subjected to undesirable fading in radiation from the transmitter to the receiver. In practice, it may be desirable to insert an automatic gain control amplifier (not shown) between terminal 114 and resistor 1168 to control the potential of control electrode 1165 of device 1164 in accordance with an automatic gain control voltage derived from video detector 43 (Figure 2).

The system provided by the present invention enables the transmitting station to have an effective control over the distribution of the broadcast information. This control may be achieved through the agency of a central telephone switchboard over existing telephone lines, or through the agency of power distribution networks presently in existence. Alternatively, a private branch exchange may be set up at the transmitter to handle the distribution of the key signal and the attendant billing of subscribers utilizing the key signals.

The effect of coding the composite television signal in accordance with the present invention is to place on the air a signal which, when received by a conventional non-subscription type receiver or by a subscription type receiver in the absence of an appropriate key signal, is characterized by a variation in the shade values of the reproduced image which manifests itself as an extremely objectionable flicker. Receiver synchronization is also disrupted by video-signal components which are translated into the blacker-than-black amplitude range normally occupied only by synchronizing pulses. Thus, it is highly desirable from the subscriber's point of view to obtain the proper key signal when he wishes to view the telecast.

While, in the embodiment shown and described, the coding signal comprises pulses of one polarity only and of fixed amplitude, it is contemplated that either or both the polarity and the amplitude of the coding signal pulses may be varied either regularly or at random to provide increased secrecy. Under the present day standards, the range between black level and synchronizing signal peaks is 25% of the peak carrier amplitude, and the range between white level and zero carrier may be as great as 15% of the peak carrier amplitude. Thus, an effective control range of substantially 40% of the peak carrier amplitude may be utilized without undesirable over-modulation.

Although the invention has been shown and described in connection with a system of the type in which decoding is effected through the agency of a key signal distributed over an auxiliary wire-line link between transmitter and receiver, it is apparent that other key-signal distribution arrangements may be employed. Alternatively, independent coding and decoding apparatus may be provided at transmitter and receiver with synchronism established through the use of suitable code wheels, cards, or the like actuated, for example, by mechanisms connected to a common power distribution system. In its broader aspect, therefore, the invention contemplates a method of encoding a composite television signal which comprises altering the amplitude relation between the video-signal components and the synchronizing-signal components during spaced time intervals, without regard to the manner in which the code schedule is distributed.

While a particular embodiment of the present invention has been shown and described, it is apparent that various changes and modifications may be made, and it is therefore contemplated in the appended claims to cover all such changes and modifications as fall within the true spirit and scope of the invention.

We claim:

1. A subscription type television transmitter comprising, in combination: a video-frequency signal generator; a scanning system for controlling said generator to develop during recurrent trace intervals video-frequency signals representing a scanned subject and having a predetermined maximum amplitude-range, and including a timing-signal generator for developing during interposed intervals timing signals normally having a fixed peak amplitude with respect to said range; a mixer device coupled to said video-frequency generator and to said scanning system for producing a composite television signal which includes in alternation said video-frequency signals and said timing signals; coding apparatus coupled to said timing-signal generator for developing a coding signal to alter the amplitude relation between said range and the peak amplitude of said timing signals during spaced time intervals only, thereby to code said composite signal; a key-signal generator controlled by said scanning system for developing a key signal indicating the times of occurrence of said spaced time intervals; and means for transmitting said coded composite signal and said key signal.

2. A subscription type of television transmitter comprising, in combination: a video-frequency signal generator; a scanning system for controlling said generator to develop during recurrent trace intervals video-frequency signals representing a scanned subject and having a predetermined maximum amplitude-range, and including a timing-signal generator for developing during interposed intervals timing signals normally having a fixed peak amplitude with respect to said range; a mixer device coupled to said video-frequency generator and to said scanning system for producing a composite television signal which includes in alternation said video-frequency signals and said timing signals; coding apparatus coupled to said mixer device and controlled by said scanning system for developing a coding signal to alter the amplitude relation between said range and the peak amplitude of said timing signals during spaced time intervals only, thereby to code said composite signal; a key-signal generator controlled by said scanning system for developing a key signal indicating the times of occurrence of said spaced time intervals; and means for transmitting said coded composite signal and said key signal.

3. A subscription type of television transmitter comprising, in combination: a video-frequency signal generator; a scanning system for controlling said generator to develop during returned trace intervals video-frequency signals representing a scanned subject and having a predetermined maximum amplitude range, and including a timing-signal generator for developing during interposed intervals timing signals normally having a fixed peak amplitude with respect to said range; a mixer device coupled to said video-frequency generator and to said scanning system for producing a composite television signal which includes in alternation said video-frequency signals and said timing signals; a key-signal generator controlled by said timing-signal generator; coding apparatus controlled conjointly by said key-signal generator and said timing-signal generator for developing a coding signal to alter the amplitude relation between said range and the peak amplitude of said timing signals during spaced time intervals only, thereby to code said composite signal; and means for transmitting said coded composite signal and said key signal.

4. A subscription type of television transmitter comprising, in combination: a video-frequency signal generator; a scanning system for controlling said generator to develop during recurrent trace intervals video-frequency signals representing a scanned subject and having a predetermined maximum amplitude range, and including a timing-signal generator for developing during interposed intervals timing signals of substantially constant peak amplitude; a mixer device coupled to said video-frequency generator and to said scanning system for producing a composite television signal which includes in alternation said video-frequency signals and said timing signals; a key-signal generator controlled by said timing-signal generator; coding apparatus coupled to said mixer device and controlled conjointly by said key-signal generator and said timing-signal generator to shift said range with respect to said constant peak amplitude during spaced time intervals only, thereby to code said composite signal; and means for transmitting said coded composite signal and said key signal.

5. A subscription type of television transmitter comprising, in combination: a video-frequency signal generator; a scanning system for controlling said generator to develop during recurrent trace intervals video-frequency signals representing a scanned subject and having a predetermined maximum amplitude range, and including a timing-signal generator for developing during interposed intervals timing signals of substantially constant peak amplitude; a mixer device coupled to said video-frequency generator and to said scanning system for producing a composite television signal which includes in alternation said video-frequency signals and said timing signals; a key-signal generator controlled by said timing-signal generator; coding apparatus coupled to said mixer device and conjointly controlled by said key-signal generator and said timing-signal generator for superimposing only during spaced time intervals a direct voltage bias on said composite signal during said trace intervals only, thereby to code said composite signal; and means for transmitting said coded composite signal and said key signal.

6. A subscription type of television transmitter comprising: a source of composite video signals including video-frequency signal components and interspersed timing-signal components; a source of key signals having a timing characteristic incommensurate with that of said timing-signal components; a source of periodic signals in synchronism with said timing-signal components; a coding device comprising a pulse-generating coincidence circuit coupled to said key-signal source and to said periodic-signal source and responsive to time coincidence of said key signals and said periodic signals to produce a control-pulse signal; and means, included in said coding device, coupled to said composite video signal source and to said coincidence circuit and responsive to said control-pulse signal to alter the amplitude relation between said timing-signal components and said video-frequency components of said composite video signal.

7. A subscription type of television transmitter comprising: a source of composite video signals including video-frequency signal components and interspersed timing-signal components; a source of key signals having a timing characteristic incommensurate with that of said timing-signal components; a source of periodic signals in synchronism with said timing-signal components; a coding device comprising a pulse-generating coincidence circuit coupled to said key-signal source and to said periodic-signal source and responsive to time coincidence of said key signals and said periodic signals to produce a control-pulse signal; and a pulse generator, included in said coding device, coupled to said composite video signal source and to said coincidence circuit and responsive to said control-pulse signal to develop a coding signal and to superimpose said coding signal on said composite video signal to alter the amplitude relation between said video-frequency components and said timing-signal components of said composite video signal.

References Cited in the file of this patent

UNITED STATES PATENTS

| Number | Name | Date |
|---|---|---|
| 2,547,598 | Roschke | Mar. 3, 1951 |
| 2,572,853 | Gray | Oct. 30, 1951 |
| 2,612,552 | Crotty | Sept. 30, 1952 |